Figure 1:
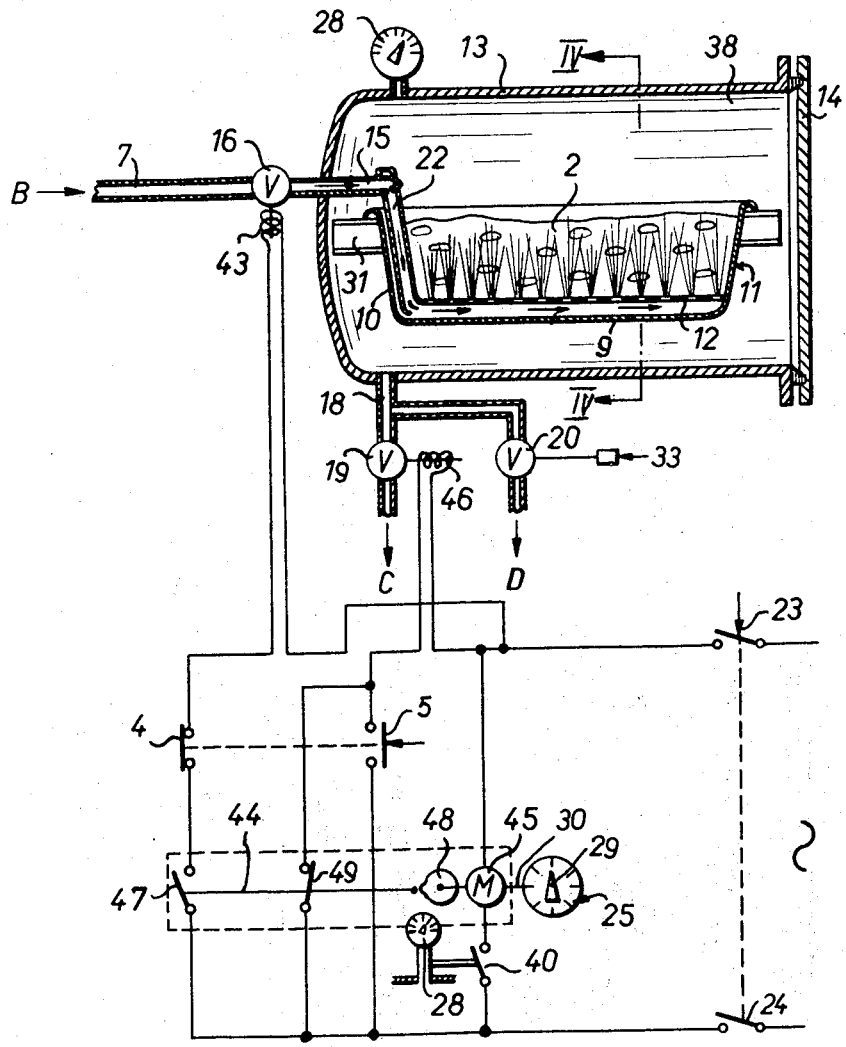

United States Patent [19]
Lüetolf

[11] 3,823,657
[45] July 16, 1974

[54] STEAM PRESSURE COOKER WITH SAFETY DEVICE

[75] Inventor: Hans Lüetolf, Meggen, Switzerland

[73] Assignee: Salvis AG, Reussbuhl, Switzerland

[22] Filed: Feb. 13, 1973

[21] Appl. No.: 332,110

[30] Foreign Application Priority Data
Feb. 17, 1972  Switzerland.......................... 2312/72
Mar. 3, 1972  Austria .............................. 1824/72

[52] U.S. Cl......................... 99/337, 99/326, 99/410, 126/20
[51] Int. Cl. ........................................... A47j 27/09
[58] Field of Search...................... 99/337, 325–326, 99/327, 330–331, 332, 335, 358, 403, 410–411, 412–413, 414–415, 416–417, 418; 126/20, 348, 369, 369.1, 369.2, 369.3

[56] References Cited
UNITED STATES PATENTS

| | | | |
|---|---|---|---|
| 1,263,004 | 4/1918 | Tollagsen............................ | 126/369 |
| 1,955,289 | 4/1934 | Greenfield ..................... | 126/369.1 X |
| 2,274,325 | 2/1942 | Ford .................................. | 99/358 X |
| 2,642,794 | 6/1953 | Spiess et al. ........................... | 99/358 |
| 2,899,534 | 8/1959 | Sjolund ........................... | 126/369 X |
| 3,071,473 | 1/1963 | Churley ............................. | 126/20 X |
| 3,391,271 | 7/1968 | Campbell........................... | 99/331 X |
| 3,431,902 | 3/1969 | Vischer................................. | 126/20 |

Primary Examiner—Edward L. Roberts
Assistant Examiner—Arthur O. Henderson
Attorney, Agent, or Firm—Wolfgang G. Fasse; Willard W. Roberts

[57] ABSTRACT

In a steam pressure cooker into which externally generated steam is introduced to build up a gauge pressure at which the cooking process is greatly accelerated. Safety means preventing the access door of the pressure vessel from being manually opened when the vessel is still under pressure and the steam admission valve from being opened when the door is not properly secured by the locking engagement of a latch.

6 Claims, 6 Drawing Figures

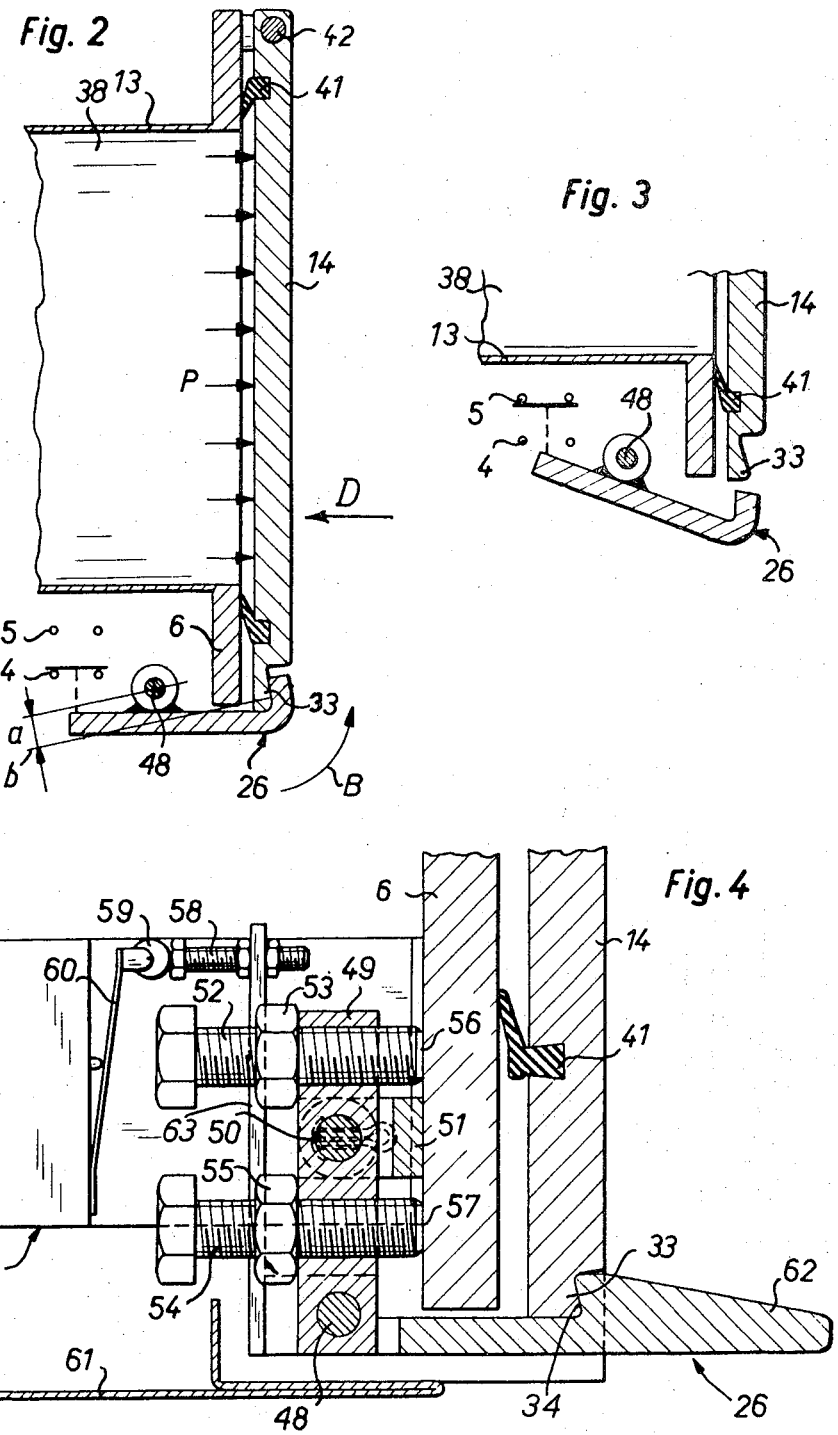

STEAM PRESSURE COOKER WITH SAFETY DEVICE

BACKGROUND OF THE INVENTION

The invention generally relates to high-speed steam pressure cookers of food and more particularly to a safety device for such cookers.

In steam pressure cookers into which externally generated steam is introduced it is necessary to prevent steam from entering the cooker until its door has been properly locked. At the same time the locking means must be so contrived that they prevent the door from being opened when the interior of the cooker is still under pressure.

Known steam pressure cookers are provided with a domed flexible cover insertable into an opening of the cooker and have a toggle mechanism securing the same by flexing the cover until it is substantially flat, causing its peripheral edges to be expanded from the inside into firm contact with the edge of the cooker opening. Although this cover cannot be opened unless the interior of the cooker is not under pressure it is nevertheless possible to pressurize the cooker despite the fact that the cover is not properly secured. This creates a hazard to the user.

SUMMARY OF THE INVENTION

It is an object of the present invention to eliminate this drawback.

The cooker according to the present invention is provided with a latch cooperating with a pivotable door and adapted to engage a projection or nose arranged on the door. An elastic sealing ring is interposed between a pressure vessel and the door which is sufficiently compressible when the interior of the pressure vessel is depressurized to permit the latch to be forced over the projection and released, whereas release of the latch by hand to open the door is prevented when said interior is pressurized. The latch cooperating through intermediate elements with a steam admission valve to keep this valve closed and/or an exhaust valve to leave this valve open when the latch is not in proper locking engagement. Therefore, steam cannot be introduced into the vessel until the door has been properly locked and the door cannot be opened by hand so long as the pressure vessel is under pressure.

Figure 5:
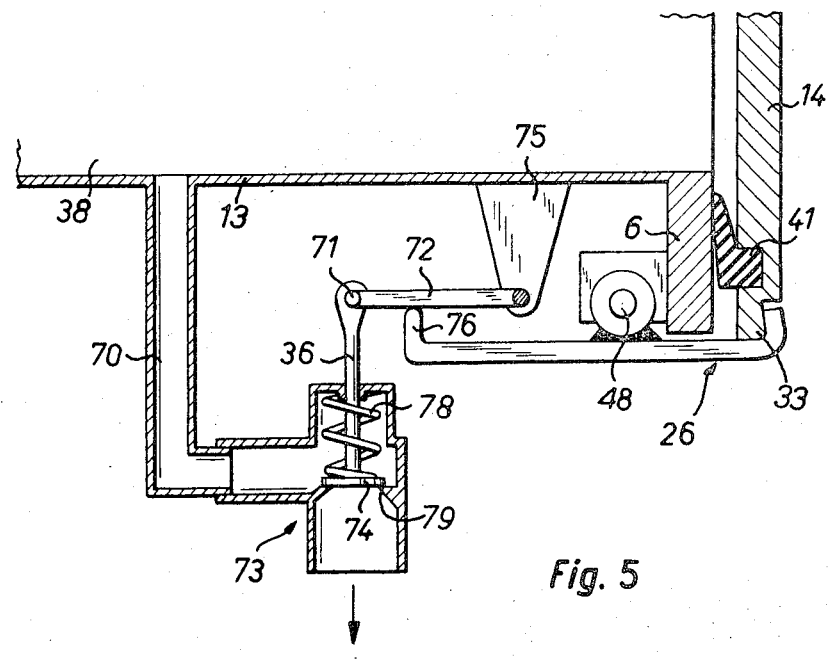
Figure 6:
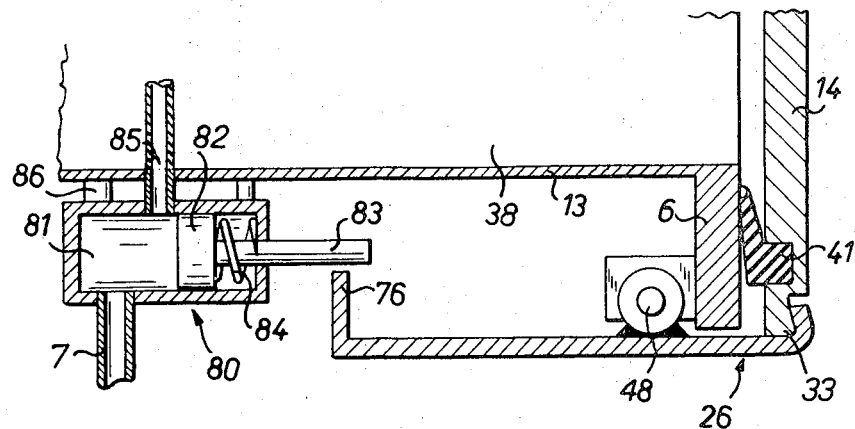

The invention will be better understood, and objects other than those set forth above, will become apparent, when consideration is given to the following detailed description thereof. Such description makes reference to the drawings, wherein:

FIG. 1 is a diagrammatic representation of a steam pressure cooking vessel according to the invention and its associated electrical control, the position of the switches and contacts corresponding to the door of the vessel being locked, FIG. 2 is a schematic horizontal section of closure means according to the invention in locked position, FIG. 3 is a fragmentary horizontal section analogous to that in FIG. 2 showing the locking mechanism in disengaged position, FIG. 4 is a horizontal section of the locking means according to the invention in greater detail, FIG. 5 is a section of a modified embodiment according to the invention, comprising mechanical control means of the exhaust valve, and FIG. 6 is a section of yet another embodiment according to the invention, comprising a locking device mechanically controlling the steam admission valve.

The food 2 that is to be cooked, such as meat, fish, vegetables, rice or potatoes, is placed into an open-top tray-like container or pan 11 which has four sloping unperforated sides 10 and an unperforated horizontal bottom 9. This pan 11 is introduced into the interior of a pressure vessel 13 which substantially consists of a horizontal cylinder with one domed end 13'. The open front end of this pressure vessel 13 can be closed and sealed by swingable door 14 mounted on hinges 42, permitting the pressure inside the vessel 13 to be raised for cooking the food more quickly than would be possible in a pan 11 or an other container which is open to the atmosphere. Horizontally attached to the insides of each of two facing sidewalls of the pressure vessel 13 is a rail 31 for supporting the bent over edge 50 of the pan 11. The door 14 cooperates with a locking lever or a latch 26 pivoting on a pin 48 which is parallel to the vertical hinge 42 of the door 14. Interposed between the door 14 and the edge of the open end face of the pressure vessel 13 is a sealing ring 41 of elastic material, such as rubber or the like.

The open top pan 11 contains steam conducting and distributing means 12 comprising a horizontal channel portion 21 extending directly above the bottom 9 of the pan 11 and an adjacent oblique channel portion 22 extending along the rear end wall 10 of the pan 11. The steam is supplied by a steam generator located outside the pressure cooker through a steam pipe 7 and a tube 15 in the direction indicated by an arrow B (FIG. 1).

By pushing a pan 11 provided with a steam distributor 12 along the rails 31 in the direction of arrow F into the vessel 13 communication will be established for the steam to enter the distributor 12 and to issue from orifices in the bottom part of the channel portion 22 so that it will then pass in fine dispersion in upflow through the food 2 in the pan 11. For more detail see cross referenced application Ser. No. 332,111 filed Feb. 13, 1973 now U.S. Pat. No. 3,790,391. (Swiss Pat. application No. 2311/72).

Before entering the pressure vessel 13 the steam 7 contains an electromagnetically operable steam admission valve 16 comprising a solenoid or an electromagnetic coil 43.

Fitted into the lowest point of the pressure vessel 13 drainage means are provided for the pressure vessel 11 consisting of an exhaust pipe 18 containing an exhaust valve 19 likewise operable by means of an electromagnetic coil 46. Through this pipe steam, air and or water can be exhausted as indicated by an arrow C. A branch pipe by-passing the exhaust valve 19 in pipe 18 or communicating directly with the interior of the vessel contains a pressure limiting valve 20 which keeps the pressure inside the pressure vessel 13 within a prescribed maximum limit by automatically opening and allowing steam and liquid to blow off in the direction indicated by arrow D when this limit is exceeded. This valve 20 can also be opened manually by depressing a key 33, for instance in the event of non-operation of the steam exhaust valve 19 due to a power failure. The pressure in the interior 38 of the pressure vessel 13 can be read on a dial gauge 28. This pressure gauge 28 has a pressure operated electrical switch 40 which it closes at a preset pressure as is well known in the art.

The electromagnetic valves 16 and 19 are normally closed and open when energized. They are connected in the circuit of a time switch or timer 25 of conventional construction. For starting the pressure cooker a two-pole main switch comprising contacts 23 and 24 is closed, the exhaust valve 19 opens immediately — assuming the door 14 is open — whereas the steam valve 16 for the time being remains shut. This position results because the contacts 5 of a door-operated switch remain closed for as long as the door is open, whereas the second contact 4 remains open. The steam valve 16 cannot open until the door 14 has been closed, the contacts have changed over so that the contact 4 now is closed and the timer 25 has been set manually to the required cooking time.

The desired cooking time can be preselected by setting the timer 25 for any desired period of operation, this being done by turning a knob or pointer 29 on a shaft 30 carrying a disc-shaped cam 48 into a desired position on the timer dial. The positions of the open switches 47 and the closed switch 49 are thus reversed; 47 being thereafter closed and 49 opened. The steam valve 16 is opened by energization of its operating coil 43 and at the same time the steam exhaust valve 19 is closed by opening the contact 49. The circuit for energizing the operating coil 43 of the valve 16 is established through the closed contacts 23 of the main switch, the coil 43 of the inlet valve 16, the closed contacts 4 and 47 and contact 24 of the main switch. The electrical circuit of the exhaust valve 19 is interrupted at that time because the contacts 5 and 49 are both open. The steam which is substantially dry steam enters the steam distributor 12, flows along the bottom of the pan 11 and passes through the food 2 from below upwards, yielding its heat as it penetrates the food 2 in upflow and condenses. Since the steam passes through the contents of the pan 11 in the upward direction and issues at the top, the food is uniformly heated up throughout its bulk very quickly.

As soon as the cooking food 1 has become hotter and the steam ceases to condense completely, pressure will build up in the interior 38 of the pressure vessel 13. When a predetermined gauge pressure has been reached in the interior 38 of the vessel 13 the timer 25 is automatically started, for example by expanding a bellows as is well known in the art and a pressure-controlled switch 40 in the gauge 28 is closed so that a circuit for the motor 45 of the timer is closed and the motor 45 begins to rotate. For pressure cooking the gauge pressure is normally limited to about 14 lbs/sq.in.

At the end of the cooking time to which the timer 25 has been set the cam 68 displaces the push rod 44, contact 47 opens and causing thereby the steam valve 16 to close and the steam exhaust valve 19 to open by virtue of the simultaneous opening of contact 49. The pressure inside the pressure vessel 13 will therefore fall to ambient pressure and the door 14 can thereafter be opened by hand for the removal of the pan 11 from the cooker.

The steam introduced through the pipe 7 causes a buildup of pressure inside the vessel 13 acting on the door 14. This pressure applies thrust to the door 14 in the direction of arrows P and causes the latch 26 to be held in engaged position so tightly that it cannot be released by hand. The latch 26 pivots on a pin 48 which is parallel to the axis of the hinge 42 of the door 14. Within range of the latch 26 the door is formed with a nose or projection 33 which has an inwardly inclined face 34 forming an outer undercut portion on the outside of the door 14. If the plane of this face 34 were imagined to be further extended it would enter the interior of the pressure vessel 13. The latch 26 has a similarly shaped undercut portion for acting together with the face 23. The pivot pin 48 of the latch 26 — viewed from the front of the pressure cooker — is located substantially in alignment behind said projection 33. The line of action $b$ (FIG. 2) of a force normal to the inclined face 34 passes the axis of the pivot 48 of the latch 26 at a perpendicular distance $a$. Consequently thrust by the door 14 in the direction of the arrows P must generate a component of force seeking to turn the latch 26 in the direction of the arrow B — i.e., in the direction for keeping the latch in engagement. The greater the pressure on the inside of the door 14 the greater will be the force keeping the latch 26 in engagement. In practice then the latch 26 cannot be released by hand until the pressure inside the pressure vessel 13 has been reduced practically to the pressure of the ambient atmosphere. When there is no gauge pressure inside the vessel 13 the door 14 must be pushed slightly inwards in the direction of arrow D, and therefore, the sealing ring 41 thus slightly compressed, to permit the latch 26 to be pushed over the extreme edge of the projection 33.

FIG. 4 shows some details of the latch 26 and the parts associated therewith. The latch 26 is formed with an extension 62 forming a handle and can be deflected about a pivot pin 48. This pin 48 is mounted in a holder 49. A fork member 51 rigidly attached to a radially extending flange 6 of the pressure vessel 13 pivotally supports this holder 49 on a pin 50. On each side of the pin 50 is a screw bolt 52, 54, each carrying a nut 53, 55. The ends 56, 57 of these bolts 52, 54 bear against the flange 6 of the vessel 13. Turning of the bolts 52, 54 permit adjustment of the exact position of engagement of the latch 26 to be set and corrected when this may be needed. Rigidly connected to the latch 26 is an elongated plate 63 which at one end carries a stud 58 which can be axially adjusted and which cooperates with a roller 59 on the actuating lever 60 of an electrical microswitch 4. Hidden in the drawing behind the stud 58 the plate 63 carries another similar stud for operating a second switch 5. Naturally the two make-and-break switches 4 and 5 could be replaced by a single switch with changeover contacts.

The bolts 52, 54 as well as the switches 4 and 5 are secreted behind a sheet metal panel 61 of the housing.

FIG. 5 illustrates a mechanical modification of the safety locking device. The latch 26 in this instance has a rearward extension 76 which cooperates with a one-armed lever 72 linked to the stem 36 of a steam exhaust or bleeder valve 73. The lever 72 and the valve stem 36 are linked by a hinge pin 71. The other end of the lever 72 is fulcrumed on a bracket 75 secured to the pressure vessel 13. If the latch 26 which pivots on the pin 48 is open or not properly closed, the valve disc 74 which is loaded by a spring 78 in closing direction cannot bear down on its seat 79, and the steam exhaust valve 73 which communicates through a pipe 70 with the interior 38 of the pressure vessel therefore remains open. Conventiently this valve may replace the valve 20 in FIG. 1.

FIG. 6 is yet another mechanical variant of the safety locking device, illustrating its association with a steam admission valve 80. At its end remote from the door 14 the latch 26 is here formed with an extension 76 bent upwards roughly at right angles to the length of the latch. The steam valve 80 contains a piston 82 attached to a piston rod 83 which extends to a point closely above the upper end of the extension 76 when the latch 26 is fully engaged. If the latch 26 is in proper locking position the piston rod 83 can be displaced into the open position shown in FIG. 6 in which the steam can flow into the vessel. However, if the latch 26 is partly disengaged or fully released then the extension mechanically prevents the steam valve from opening because the piston rod 33 will be intercepted by the extension 76. If no steam enters the chamber 81 the spring 84 will push the piston into a position in which it covers the exit pipe 85 which communicates with the interior of the pressure vessel or with the tube 15. Preferably this valve 80 may be an additional valve placed in series with the electromagnetically operable valve 16, 43.

Various changes and modifications may be made within the inventive concept.

I claim:

1. A steam pressure cooker for cooking or heating food, comprising a pressure vessel (13) having a pressure sealing door (14), a steam supply pipe (7) communicating with said vessel (13) for introducing externally generated steam into said vessel, steam inlet valve means (16) for controlling the flow of steam under pressure into said vessel (13), exhaust line means (18) communicating with said vessel (13), exhaust valve means (19, 20) for controlling the exhaust from said vessel, securing means (26) for said door (14), an elastic, compressible sealing ring (41) interposed between the vessel (13) and said door, said securing means (26) for said door (14) comprising a projecting organ (33) and a moveable member (26) being adapted to engage behind said projecting organ (33) so that release of the movable member (26) to open the door (14) is prevented when the interior of said vessel (13) is pressurized, intermediate means cooperating with at least one of said valve means (16, 19, 20) for closing said steam inlet valve means (16) or to open said exhaust valve means (19) when said movable member (26) is not in proper locking engagement.

2. A cooker according to claim 1, wherein said movable member is a latch (26) cooperating with a electrical contact pair (4, 5), one of them being in the circuit of said steam inlet valve means (16, 43) and the other being in the circuit of said exhaust valve means (18, 46), said contacts opening the exhaust valve means (18, 46) and closing the steam inlet valve means (16, 43) when the latch (26) is disengaged and the positions of said contacts are reversed when the latch (26) is in full locking engagement.

3. A cooker according to claim 1, wherein the movable member is a latch (15) mounted in a pivotal part (49) affixed to the vessel (13), and that the projecting organ (33) is on the door (14) and has an inwardly sloping face (34) which, when urged against the cooperating face of the latch (26) when the door is subjected to pressure from the inside of the vessel (13), generates a turning moment seeking to deflect the latch (26) in closing direction (B).

4. A cooker according to claim 1 wherein the movable member is a latch (26), a holder (49) for pivotally supporting said latch (26), means for pivotally supporting said holder (49), a screw bolt (52, 54) arranged on each side of the pivot axis (50) for adjusting the position of said latch relative to said door (14).

5. A cooker according to claim 1 wherein said movable member (26) cooperates mechanically with a stem (36) of a steam exhaust valve (73) to hold said valve open when said movable member is not in proper locking engagement.

6. A cooker according to claim 1 wherein said movable member (26) mechanically cooperates with said steam inlet valve means (80), said inlet valve means comprising a piston (82) and a stem (83) intercepted by said movable member (26) and preventing a steam admission port (85) from being uncovered when said movable member (26) is not in proper locking engagement.

* * * * *